(12) United States Patent
Saikaly et al.

(10) Patent No.: US 8,520,947 B2
(45) Date of Patent: Aug. 27, 2013

(54) METHOD FOR AUTOMATIC BOUNDARY SEGMENTATION OF OBJECT IN 2D AND/OR 3D IMAGE

(75) Inventors: Manale Saikaly, London (CA); Aaron Fenster, London (CA); Hanif Ladak, London (CA)

(73) Assignee: The University of Western Ontario, Ontario (CA)

( * ) Notice: Subject to any disclaimer, the term of this patent is extended or adjusted under 35 U.S.C. 154(b) by 808 days.

(21) Appl. No.: 12/601,040

(22) PCT Filed: May 22, 2008

(86) PCT No.: PCT/IB2008/003171
§ 371 (c)(1),
(2), (4) Date: Nov. 20, 2009

(87) PCT Pub. No.: WO2009/013636
PCT Pub. Date: Jan. 29, 2009

(65) Prior Publication Data
US 2010/0134517 A1 Jun. 3, 2010

Related U.S. Application Data

(60) Provisional application No. 60/939,443, filed on May 22, 2007.

(51) Int. Cl.
*G06K 9/34* (2006.01)
(52) U.S. Cl.
USPC .......................................... 382/173; 382/131
(58) Field of Classification Search
USPC ................... 348/65; 382/128, 131; 600/443
See application file for complete search history.

(56) References Cited

U.S. PATENT DOCUMENTS 6,385,332 B1 * 5/2002 Zahalka et al. ............... 382/128
6,561,980 B1 * 5/2003 Gheng et al. .................. 600/443

(Continued)

OTHER PUBLICATIONS

Liu, Y. J., Ng, W. S., Teo, M. Y., and Lim, H. C., "Computerised prostate boundary estimation of ultrasound images using radial bas-relief method," Medical & Biological Engineering & Computing, vol. 35, p. 445-454, Sep. 1997.*

(Continued)

*Primary Examiner* — Vu Le
*Assistant Examiner* — Xuemei Chen
(74) *Attorney, Agent, or Firm* — Reed Smith LLP

(57) ABSTRACT

Segmenting the prostate boundary is essential in determining the dose plan needed for a successful bracytherapy procedure—an effective and commonly used treatment for prostate cancer. However, manual segmentation is time consuming and can introduce inter and intra-operator variability. This present invention describes an algorithm for segmenting the prostate from two dimensional ultrasound (2D US) images, which can be full-automatic, with some assumptions of image acquisition. Segmentation begins with the user assuming the center of the prostate to be at the center of the image for the fully-automatic version. The image is then filtered to identify prostate edge candidates. The next step removes most of the false edges and keeps as many true edges as possible. Then, domain knowledge is used to remove any prostate boundary candidates that are probably false edge pixels. The image is then scanned along radial lines and only the first-detected boundary candidates are kept the final step includes the removal of some remaining false edge pixels by fitting a polynomial to the image points and removing the point with the maximum distance from the fit. The resulting candidate edges form an initial model that is then deformed using the Discrete Dynamic Contour (DDC) model to obtain a closed contour of the prostate boundary.

23 Claims, 18 Drawing Sheets

(56) References Cited

U.S. PATENT DOCUMENTS

| | | |
|---|---|---|
| 6,778,690 B1 | 8/2004 | Ladak et al. |
| 6,792,071 B2 | 9/2004 | Dewaele |
| 7,804,989 B2* | 9/2010 | Suri et al. ............... 382/128 |
| 7,856,130 B2* | 12/2010 | Suri et al. ............... 382/128 |
| 7,894,650 B2* | 2/2011 | Weng et al. ............. 382/128 |
| 2008/0186378 A1* | 8/2008 | Shen et al. ............... 348/65 |
| 2009/0010511 A1* | 1/2009 | Gardner et al. ........... 382/128 |
| 2009/0097727 A1* | 4/2009 | Jolly et al. ............... 382/131 |
| 2009/0136108 A1* | 5/2009 | Badiei et al. ............. 382/131 |
| 2011/0110567 A1* | 5/2011 | Jiang ....................... 382/128 |
| 2011/0299750 A1* | 12/2011 | Cool et al. ............... 382/131 |

OTHER PUBLICATIONS

Kwoh, C. K., Teo, M. Y., Ng, W. S., Tan, S. N., and Jones L. M., "Outlining the prostate boundary using the harmonics method," Medical & Biological Engineering & Computing, vol. 36, p. 768-771, Nov. 1998.*

Shao, F., et al., "Prostate boundary detection from ultrasonographic images," J. Ultrasound in Medicine, vol. 22, pp. 605-623, 2003.*

Pathak, S. D., et al., "Edge-guided boundary delineation in prostate ultrasound images," IEEE Trans. Med Image, vol. 19(12), pp. 1211-1219, Dec. 2000.*

* cited by examiner $\dfrac{1}{273}$ 
| 1 | 4 | 7 | 4 | 1 |
|---|---|---|---|---|
| 4 | 16 | 26 | 16 | 4 |
| 7 | 26 | 41 | 26 | 7 |
| 4 | 16 | 26 | 16 | 4 |
| 1 | 4 | 7 | 4 | 1 |

Figure 3

|   |    |   |     |    |    |    |
|---|----|---|-----|----|----|----|
| 0 | -1 | 0 |     | -1 | -1 | -1 |
| -1| 4  | -1|     | -1 | 8  | -1 |
| 0 | -1 | 0 |     | -1 | -1 | -1 |

Figure 4

| 0 | 0 | -1 | 0 | 0 |
|---|---|---|---|---|
| 0 | -1 | -2 | -1 | 0 |
| -1 | -2 | 16 | -2 | -1 |
| 0 | -1 | -2 | -1 | 0 |
| 0 | 0 | -1 | 0 | 0 |

METHOD FOR AUTOMATIC BOUNDARY SEGMENTATION OF OBJECT IN 2D AND/OR 3D IMAGE

CLAIM OF PRIORITY

This application is a national phase application pursuant to 35 U.S.C. §371 of International Application No. PCT/IB2008/003171, filed May 22, 2008, which claims priority to U.S. Provisional Patent Application No. 60/939,443 filed on May 22, 2007.

The present application claims priority to the provisional application 60/939,443 filed to the United States Patent and Trademark Office on May 22, 2007, the content of which is hereby incorporated by reference into the present application.

FIELD OF THE INVENTION

The present invention relates in general to medical imaging systems, and more specifically, to a method for generating an automatic segmentation of the prostate boundary from 2D and 3D images.

BACKGROUND OF THE INVENTION

The prostate gland is an essential part of the male reproductive system. Located in the pelvis behind the pubic bone and right in front of the rectum and below the neck of the bladder, the prostate completely surrounds the urethra, which is the passageway that carries urine from the bladder through the penis and out of the body. In a healthy adult male, the prostate is approximately the size and shape of a walnut, weighing about 20 grams and measuring about 3 cm in width and 2.8 cm in length. Partly fibromuscular and partly glandular, the prostate gland is divided into the following four regions: Anterior fibromuscular zone, peripheral zone, central zone, and transition zone (McNeal 1988). One of the functions of the prostate is to produce a thin and milky seminal fluid that mixes with the fluid produced by the seminal vesicles, a pair of glands attached to it, to make the semen. The sperm, carried from the testicles to the prostate through the vas deferens tube, mixes with the semen. The resulting fluid is then ejaculated during orgasm first by the ejaculatory ducts to the urethra and then through the urethra out of the body.

Prostate cancer occurs when cells of the prostate begin to grow and to multiply out of control. These cells may spread out of the prostate to the nearby lymph nodes, bones or other parts of the body. This spread is called metastasis. Prostate cancer is the most commonly diagnosed malignancy in men, and is found at autopsy in 30% of men at the age of 50, 40% at age 60, and almost 90% at age 90 (Garfinkel et al. 1994). Worldwide, it is the second leading cause of death due to cancer in men. At its early stages, the disease might not have any symptoms. Some men, however, might experience symptoms that could indicate the presence of prostate cancer. Some of these symptoms include frequent and burning urination, difficulty starting a urinary stream, difficulty in having an erection, and painful ejaculation. Since these symptoms could also indicate other diseases, these men would undergo screening for prostate cancer.

When diagnosed at an early stage, prostate cancer is curable. The purpose of screening is to detect prostate cancer at its early stages before the development of any symptoms. It can be performed using two tests: the prostate-specific antigen (PSA) blood test, and the digital rectal exam (DRE).

If the DRE finds an abnormality in the prostate, or the blood test reveals a high level of PSA, then a biopsy of the prostate is recommended. A biopsy is a surgical procedure that involves removing samples of prostate tissues for microscopic examination to determine if they contain cancer cells. In the transrectal biopsy, which is the most commonly used method, a hand-held biopsy gun with a spring-loaded slender needle is guided through the wall of the rectum into the prostate gland then quickly removed. This is done under transrectal ultrasound (TRUS) guidance—a procedure that uses ultrasound generated from a probe that is inserted into the rectum to create an image of the prostate gland. The biopsy needle will contain a cylinder of a prostate tissue sample used for histological examination. This is repeated several times; each biopsy resulting in a sample from a different area of the prostate. Despite the fact that many samples (around 12) are obtained, cancer can still be missed if none of the biopsy needles pass through the cancerous growth. Although this procedure is low-risk, complication may occur. Some possible treatable complications could include prolonged bleeding into the urethra, and infection of the prostate gland or urinary tract.

An appropriate treatment choice of the prostate cancer is based primarily on its stage, PSA level, and other factors like the man's age and his general health. Treatment options change considerably if the cancer has already spread beyond the prostate. The results of this project will be used in procedures to treat localized prostate cancer, which has four treatment options, (Bangma et al. 2001), of which include brachytherapy.

Brachytherapy is radiation therapy that is minimally invasive and that involves inserting seeds containing radioactive material directly into the prostate. LDR, or low-dose-rate brachytherapy, consists of inserting low-dose or low-energy seeds permanently into the prostate. HDR, or high-dose-rate brachytherapy, on the other hand, involves placing high-dose or high-energy seeds temporarily into the prostate, and then removing them once the desired radiation dose has been delivered. HDR provides better dose control, whereas LDR is simpler and with lower risk of infection since it doesn't involve a removal procedure (Nag S. 1997). Appropriate candidates for brachytherapy are men with cancer confined to the prostate gland.

Implantation techniques for prostate brachytherapy had started as early as 1913 by inserting radium through a silver tube that was introduced into the urethra. Brachytherapy evolved in the 1970's with Whitmore who invented an open implant technique that involved interstitial implantation using an open retropubic surgery. In 1980, Charyulu described a transperineal interstitial implant technique. Then, in 1983, Holm, an urologist from Denmark, invented the TRUS-guided technique for implanting permanent radioactive seeds transperineally into the prostate (Nag et al. 1997). This technique became very popular for many reasons including the fact that it is a minimally invasive, outpatient and one-time procedure (Nag et al. 1997).

Transperineal prostate brachytherapy employs TRUS as the primary imaging modality. Under TRUS guidance, a needle carrying the radioactive seeds is inserted through the perinium and into the prostate via a template.

A successful brachytherapy procedure requires several steps, including preoperative volume study using TRUS, computerized dosimetry, pubic arch interference determination since the pubic arch is a potential barrier to the passage of the needles, and postoperative dosimetric evaluation (Pathak et al. 2000). Image processing and specifically outlining the prostate boundary accurately plays a key role in all four steps (Grimm et al. 1994). In the volume study, the TRUS probe is inserted into the rectum to acquire a series of cross-sectional 2D images at a fixed interval from the base to the apex (Nag et al. 1997). Then, the prostate boundary is outlined on these cross-sectional 2D image slices using a segmentation algorithm.

Traditional segmentation algorithms involved a skilled technician to manually outline the prostate boundary. Although this provides an acceptable result (Tong et al. 1996), it is time consuming and is prone to user variability. Therefore, several semi-automatic and fully automatic algorithms, which can be classified into edge-based, texture-based and model-based, have been proposed for segmenting the prostate boundary from 2D TRUS images.

Edge-Based Prostate Boundary Detection Methods from 2D TRUS Images:

These algorithms first find image edges by locating the local peaks in the intensity gradient of the image, and then they outline the prostate boundary by performing edge selection followed by edge linking (Shao et al. 2003). Aamink et al. presented an edge-based algorithm for determining the prostate boundary using the gradient of the image in combination with a Laplace filter. They located possible edges at the zero crossings of the second derivative of the image and determined the edge strength by the value of the gradient of the image at that location. Then they used knowledge-based features and ultrasonic appearance of the prostate to choose the correct edges. Finally, they used adaptive interpolation techniques to link the edges that actually present a boundary (Aamink et al. 1994). This method gave good results but it could generate erroneous edges due to artifacts in the image (Shao et al. 2003).

Pathak et al. also used an edge-based method for outlining the prostate boundary from transrectal ultrasound images. First, they enhanced the contrast and reduced image speckle using the sticks algorithm (Pathak et al. 2000). Then, they further smoothed the resulting image using an anisotropic diffusion filter, and used prior knowledge of the prostate and its shape and echo pattern in ultrasonic images to detect the most probable edges. Finally, they overlaid the detected edges on the top of the image and presented them as a visual guide to the observers to manually delineate the prostate boundary (Pathak et al. 2000).

Liu et al. also used an edge-based technique called the radial "bas-relief" (RBR) method for prostate segmentation where they obtained a "bas-relief" image, which they superimpose on the original TRUS image to obtain the edge map (Liu et al. 1997). Its insensitivity to edges parallel to the radial direction from the centre of the prostate was the weakness of this method (Chiu et al. 2004). In addition, this method failed if the image centre and the prostate boundary centroid were far from each other.

Texture-Based Prostate Boundary Detection Methods from 2D TRUS Images

These techniques characterize regions of an image based on the texture measures. They can determine regions of the image with different textures, and create borders between them to produce an edge map. In their work, Richard and Keen presented an automatic texture-based segmentation method, which was based on a pixel classifier using four texture energy measures associated with each pixel in the image to determine the cluster it belongs to (Richard & Keen 1996). One of the drawbacks of this method was that the resulting prostate may be represented by a set of disconnected regions (Chiu et al. 2004).

Model-Based Prostate Boundary Detection Methods from 2D TRUS Images

These techniques use prior knowledge of 2D TRUS images of the prostate to delineate the prostate boundary efficiently. Some model-based methods are based on deformable contour models, in which a closed curve deforms under the influence of internal and external forces until a curve energy metric is minimized (Ladak et al. 2000). Other methods are based on statistical models, in which the variation of the parameters describing the detected object are estimated from the available segmented images and are used for segmentation of new images. The statistical models are obtained from a training set in an observed population (Shao et al. 2003).

Prater et al. presented a statistical model-based method for segmenting TRUS images of the prostate using feed-forward neural networks. They presented three neural network architectures, which they trained using a small portion of a training image segmented by an expert sonographer (Prater et al. 1992). Their method had the disadvantage of needing extensive training data.

Pathak et al. presented a method based on snakes to detect the prostate boundary from TRUS images. They first used the sticks algorithm to selectively enhance the contrast along the edges, and then integrated it with a snakes model (Pathak et al. 1998). This algorithm required the user to input an initial curve for each ultrasound image to initiate the boundary detection process. This algorithm is very sensitive to the initial curve and only works well when this initial curve is reasonably close to the prostate boundary (Shao et al. 2003).

Ladak et al. presented a model-based algorithm for 2D semi-automatic segmentation of the prostate using a discrete dynamic contour (DDC) approach. It involved using cubic spline interpolation and shape information to generate an initial model using only four user-defined points to initialize the prostate boundary. This initial model was then deformed with the DDC model (Ladak et al 2000).

Ladak's segmentation algorithm gave good results, demonstrating an accuracy of 90.1% and a sensitivity of 94.5%. In this approach, manual initialization required about 1 min, but the prostate segmentation procedure required about 2 seconds. (Ladak et al. 2000). However, this method requires careful manual initialization of the contour and further user interaction to edit the detected boundary, which introduces complexity and user variability.

Reducing or removing user interaction, and as a result the variability among observers, would produce a faster, more accurate and reproducible segmentation algorithm. In addition, it may remove the need for the user to initialize the segmentation procedure, a critical criteria for an intraoperative prostate brachytherapy procedure.

The present invention provides an automatic prostate boundary segmentation method that minimizes and/or eliminates user initialization for segmenting the prostate in 2D or 3D images; thereby reducing both the time required for the procedure and the inter/intra-operator variability ultimately improving the effectiveness and utility of medical in the diagnosis and treatment of prostate cancer.

SUMMARY OF THE INVENTION

The present invention relates generally to a method and approach for generating automatic prostate boundary segmentation for 2D and 3D images. A fully-automated algorithm to select the prostate boundary is provided.

The method is composed of:

prostate initialization by making an assumption about the center of the prostate, edge detection using a filter to remove detail and noise, length thresholding to remove false edges and keep true edges on the prostate boundary, use of prior knowledge to aid in determining the prostate boundary by removing any prostate boundary candidates that are false edge pixels, scanning along radial lines to keep first boundary candidates.

polynomial fitting to remove remaining false edge pixels and to identify unconnected edge pixels that are on the prostate boundary, and the use of pixels as initial points to a DDC model to obtain a closed contour of the prostate boundary.

Shown in this present invention is that the fully-automatic version of the algorithm performs well. Thus this method for automatic prostate boundary segmentation eliminates user initialization for segmenting the prostate from 2D TRUS images, minimizes the time required for complete prostate segmentation, reduces inter and intra-operator variability and improves the effectiveness and utility of TRUS in diagnosis and treatment of prostate cancer. Although shown here is the use of this method in prostate boundary segmentation, this method is also applicable to segmentation of any object including, tumors, kidneys, and other organs. Also shown in this present invention is the use of 2D TRUS images for initialization, however, it is also applicable to other 2D or 3D US, CT and MRI images.

BRIEF DESCRIPTION OF THE DRAWINGS

The present invention will be further understood and supported using the following drawings and their associated descriptions. These descriptions and drawings are not meant to limit the invention by any circumstance and are to be interpreted as possible embodiments of the invention disclosed herein. The methods utilized in the generation of the data represented by these drawings are commonly known within the art and may be reproduced identically by employing the methods described herein.

FIG. 3 shows a mask used to implement the digital Gaussian filter with $\sigma=1$.

FIG. 4 shows masks used to implement the digital 3×3 Laplacian filter.

Figure 5:
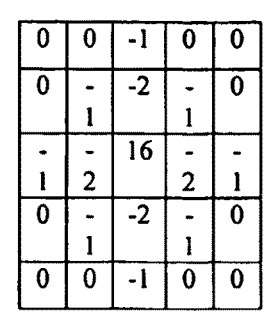

FIG. 5 shows 5×5 digital approximation to the LoG filter.

Table 1 shows t statistic's significance level optimization. Mean number of clusters on prostate boundary, mean of their maximum gap, and mean number of clusters off the boundary for the four prostate images used for different significant level values.

Table 2 shows F statistic's significance level optimization. Mean number of clusters on prostate boundary for the four prostate images used, mean of their maximum gap, and mean number of clusters off the boundary for each significant level value $\alpha_F$.

Table 3 shows evaluation metrics MD, MAXD, PC, AO, and AD for the semi-automatic version of our segmentation algorithm for the entire set of 51 prostate images. The first six entries are for the images shown in FIG. 4.

Table 4 shows evaluation metrics MD, MAXD, PC, AO, and AD for the fully-automatic version of our prostate segmentation algorithm for the entire set of 51 prostate images, and the mean and the standard deviation for the entire set.

DETAILED DESCRIPTION OF THE INVENTION

Figure 1:
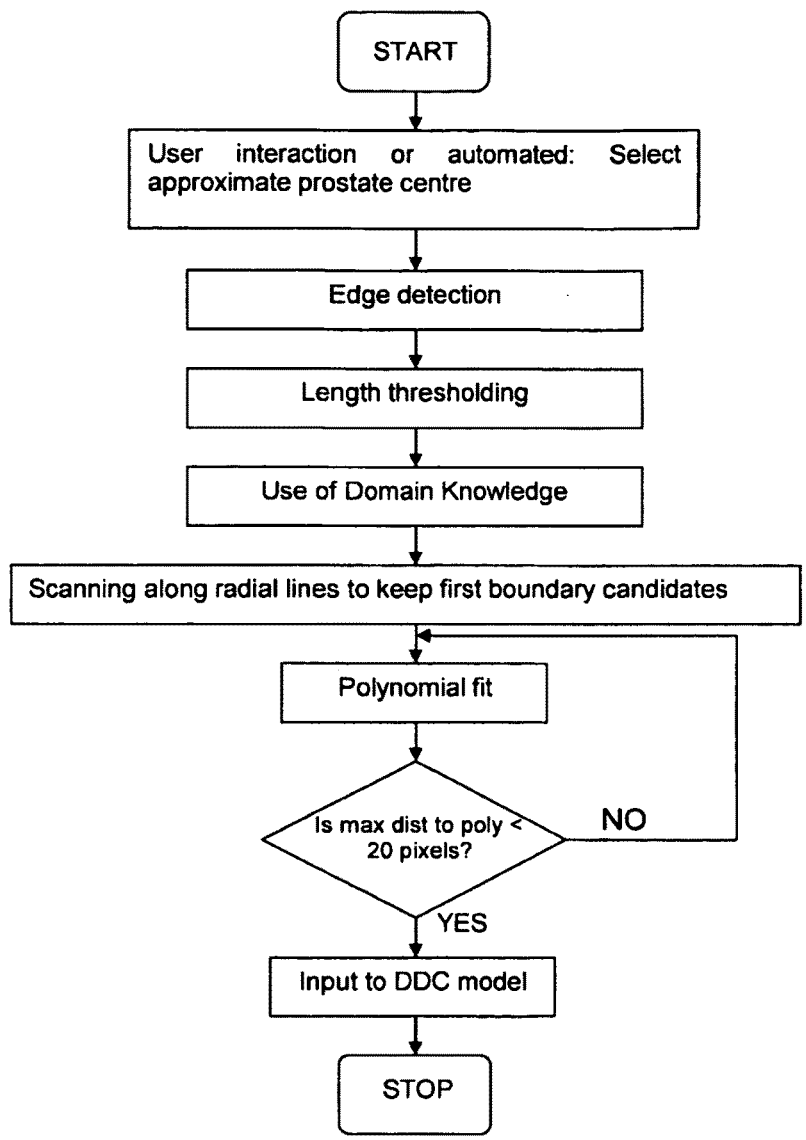
FIG. 1 shows a flow chart of our proposed prostate segmentation algorithm. The following sections describe the steps used to generate the initial prostate boundary that is used as an input into Ladak's DDC segmentation algorithm.
Figure 2:
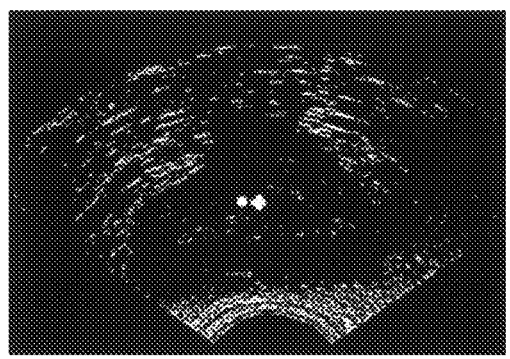
FIG. 2 shows prostate initialization. Approximate prostate center is chosen manually or automatically.

In accordance with one aspect of the present invention, as an input, the algorithm requires the approximate prostate centre. For prostate brachytherapy, the prostate gland is typically centred at the approximate centre of the image. In this case, the user does not need to select the prostate centre; as a result, the algorithm of the present invention would be fully-automatic. In cases when the prostate is not centred at the centre of the image, the user must select the approximate centre; as a result, our algorithm would be semi-automatic. FIG. 2 shows a 2D prostate TRUS image with the location of the user-selected centre shown by a dot and the centre of the image shown as a cross.

The Gaussian filter is used to blur the image and remove some detail and noise by convolving it with the 2D Gaussian distribution h(x, y):

$$h(x, y) = \frac{1}{2\pi\sigma^2} e^{-\frac{x^2+y^2}{2\sigma^2}} \quad (1)$$

where σ is the standard deviation that determines the degree of smoothing. A digital approximation to the Gaussian function with σ=1 can be implemented using a 5×5 mask shown in FIG. 3. A larger σ would require a larger mask.

Used for edge detection, the Laplacian of a function (image), f(x, y), is a 2D second-order derivative defined as (Gonzalez and Woods 2002):

$$\nabla^2 f = \frac{\partial^2 f}{\partial x^2} + \frac{\partial^2 f}{\partial y^2} \quad (2)$$

Figure 4:
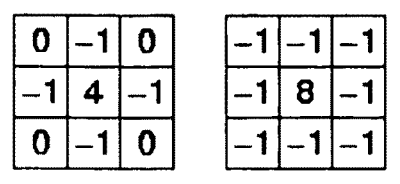

The Laplacian highlights regions of rapid intensity change. FIG. 4 shows two most commonly used digital approximations to the Laplacian filter for a 3×3 region.

The Laplacian filter is very sensitive to noise since it is a second-order derivative, is unable to detect an edge direction and its magnitude produces double edges (Gonzalez and Woods 2002).

Since the Laplacian filter is very sensitive to noise, the image can first be smoothed by convolving it with a Gaussian filter; the result is then convolved with a Laplacian filter. Since the convolution operator is associative, the same result can be obtained by convolving the Gaussian filter with the Laplacian filter first to obtain the Laplacian of Gaussian (LoG) filter, which is then convolved with the image as shown in equation 3.

$$\begin{aligned}\text{Output Image} &= (\text{Input Image} * \text{Gaussian filter}) * \\ &\quad \text{Laplacian filter} \\ &= (\text{Input Image}) * (\text{Gaussian filter} * \\ &\quad \text{Laplacian filter}) \\ &= (\text{Input Image}) * (\text{Laplacian of Gaussian filter})\end{aligned} \quad (3)$$

The 2-D LoG operator with Gaussian standard deviation σ is given by:

$$LoG(x, y) = -\frac{1}{\pi\sigma^4}\left[\frac{x^2+y^2}{2\sigma^2} - 1\right]e^{-\frac{x^2+y^2}{2\sigma^2}} \quad (4)$$

The LoG filter consists of convolving the image with LoG (x, y) operator, which yields an image with double edges. Then, finding edge location consists of finding zero crossings between the double edges.

The LOG filter inputs two parameters: the standard deviation, σ, and a sensitivity threshold in the range [0,1] used to ignore edge points with 2D first-order derivative (gradient magnitude at that location) not greater than T. Setting T to 0 produces edges that are closed contours. We used the built-in Matlab command, edge, specifying the two parameters σ and T of the LoG filter. The size of the filter is n×n, where n=ceil (σ×3)×2+1, and ceil rounds (σ×3) to the nearest integer greater than or equal to (σ×3). The output of the edge command is a logical array with 1's where edge points were detected, and 0's elsewhere as shown in FIG. 6 (Gonzalez et al. 2004).

Figure 6:
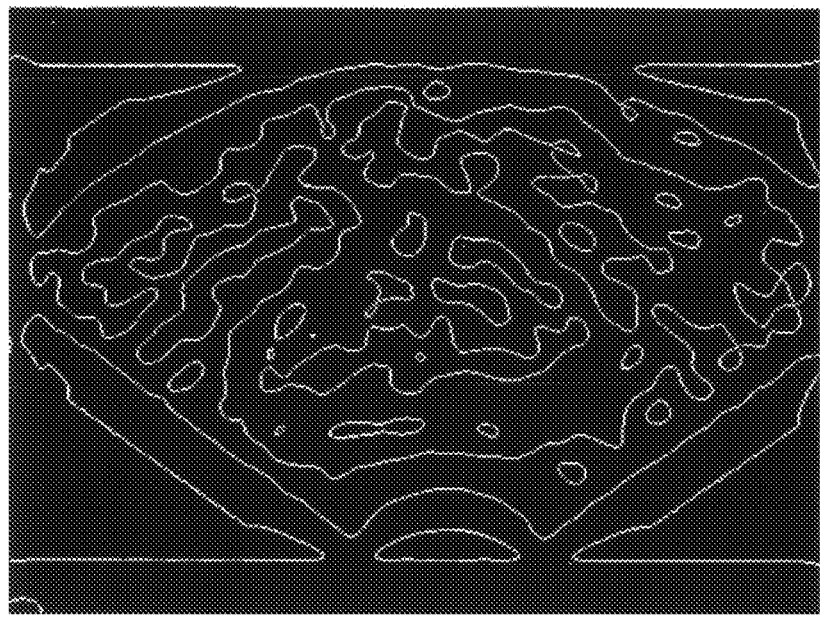
FIG. 6 shows the LOG filter result of the prostate image in FIG. 2.2 for $T=0$ and $\sigma=7$.

Visual comparison of FIGS. 2 and 6 shows that some of the edges in FIG. 6 are "true" edges on the prostate boundary, and others are "false" edges that represent noise, calcifications and other structures. The aim of the next steps is to remove most of the false edges and keep as many correct edges as possible.

Figure 7:
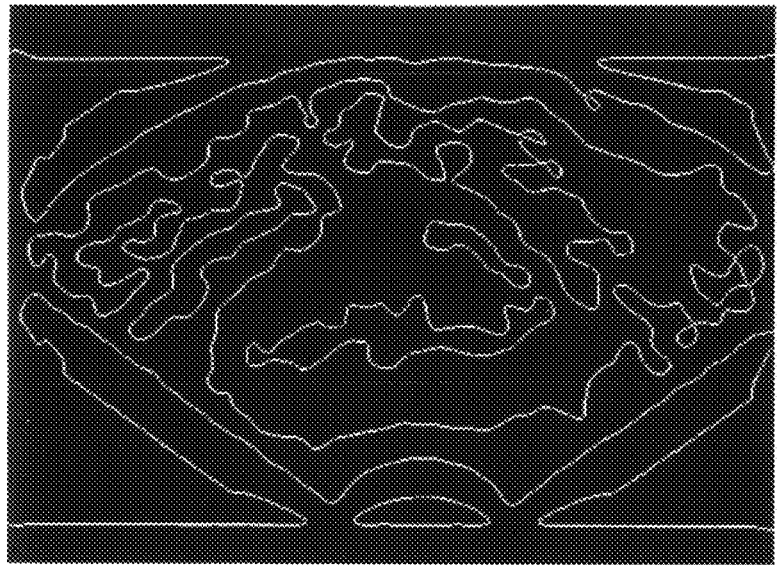
FIG. 7 shows results after removing short-length connected components. (a) After removing connected components less than 120 pixels from the image in FIG. 6. (b) After removing connected components shorter than 425 pixels with a minimum distance to the centre less than 50 pixels. One connected component inside the prostate gland was removed.
Figure 7:
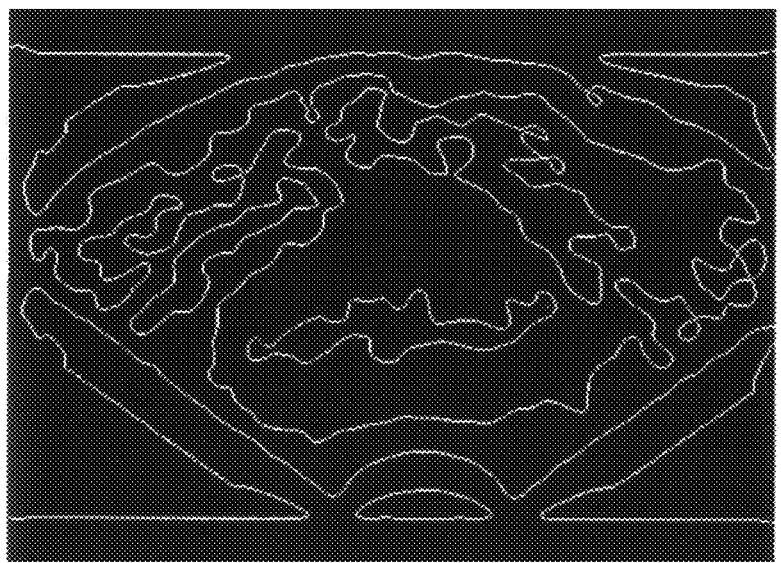

Groups of edge pixels in FIG. 6 are linked together to form the image's connected components, some are short lengths consisting of few pixels and others are long lengths consisting of many pixels. For most prostate images, connected components less than 120 pixels, or 24 mm, are not part of the prostate boundary; therefore such connected components are removed. FIG. 7 (a) shows the results of applying this step to the image in FIG. 6. In addition, connected components are removed with lengths less than 425 pixels, or 85 mm, and with a distance to the prostate centre that is less than 50 pixels, or 10 mm, as they would lie inside the gland since an average prostate gland measures more than 25 mm in width and height. The result of applying this step to the image in FIG. 6 is shown in FIG. 7 (b).

To identify the boundary of an object in an image, experts use a prior knowledge of the particular image class (Nanayakkara et al. 2006, Karmakar et al. 2002). To remove more of the "false" edges from the image shown in FIG. 7 (b), a prior knowledge of a typical prostate image was also used to help with determining the boundary. Some observations about 2D TRUS images of the prostate include:

The inside of the prostate gland is typically darker than the outside.

The inside of the prostate gland is typically smoother than the outside.

An average prostate in patients undergoing a brachytherapy procedure is approximately 3 cm in width and 2.8 cm in height.

Using these criteria, three tests were performed on each edge pixel, where each is assigned a probability of being part of the prostate boundary.

Figure 8:
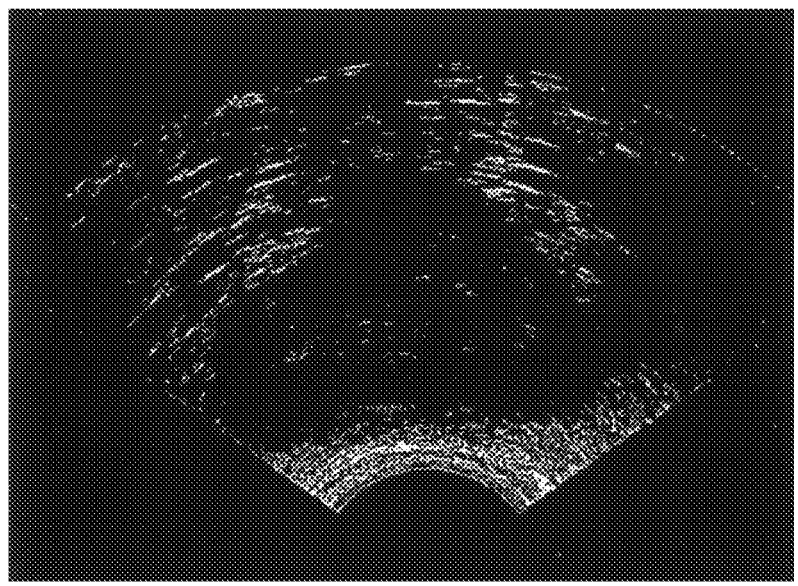
FIG. 8 shows an image in which matrices $I_{in}$ and $I_{out}$ represents two 5×5 regions at the pixel P on the inside and the outside of the prostate respectively. $X_{out}$ is the mean of $I_{out}$, $X_{in}$ the mean of $I_{in}$, $\sigma_{out}$ the standard deviation of $I_{out}$ and $\sigma_{in}$ the standard deviation of $I_{in}$.

In this test, the following observation was used: inside of the prostate is typically darker than the outside. Matrices $I_{out}$ and $I_{in}$ represent two 5×5 regions at a border candidate pixel, P, with mean grey levels $X_{out}$ and $X_{in}$ respectively as shown in FIG. 8. To prevent any overlap between these 2 matrices, their centres were chosen to be 10 pixels, or 2 mm, away from P. In order for the pixel P to be on the prostate boundary, $I_{out}$ has to be brighter than $I_{in}$, and as a result $X_{out}$ should be greater than $X_{in}$ (Nannayakkara et al. 2006).

Since estimates of $X_{out}$ and $X_{in}$ are subject to variation due to image noise, it was tested whether $X_{out}$ is greater than $X_{in}$, and assigned a probability of boundary membership based on the t-test where t-statistic is defined as (Rosner 2000):

$$t = \frac{(X_{out} - X_{in})}{\sqrt{\left(\frac{\sigma_{out}^2}{n}\right) + \left(\frac{\sigma_{in}^2}{n}\right)}} \quad (5)$$

where $\sigma_{out}^2$ is the variance of region $I_{out}$, $\sigma_{in}^2$ is the variance of $I_{in}$, and n is the size of $I_{out}$ and $I_{in}$.

Figure 9:
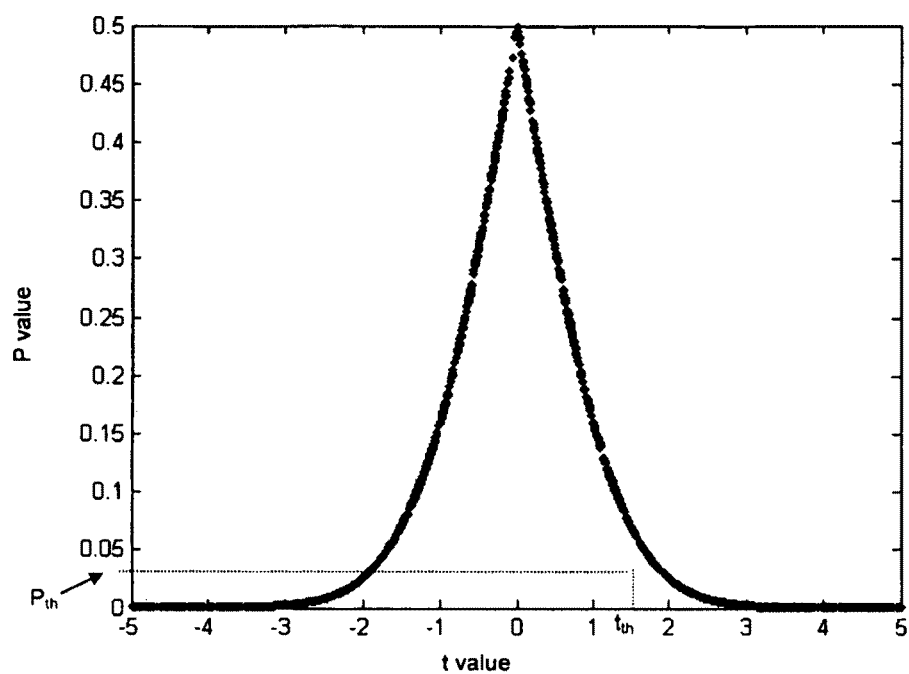
FIG. 9 shows t-values with their corresponding P-values.

If a pixel is indeed on the prostate boundary, its t-value has to be positive and significantly different than zero. The significance of the difference is measured by a P-value. FIG. 9 shows the t-values of the image pixels with their corresponding P-values.

Figure 10:
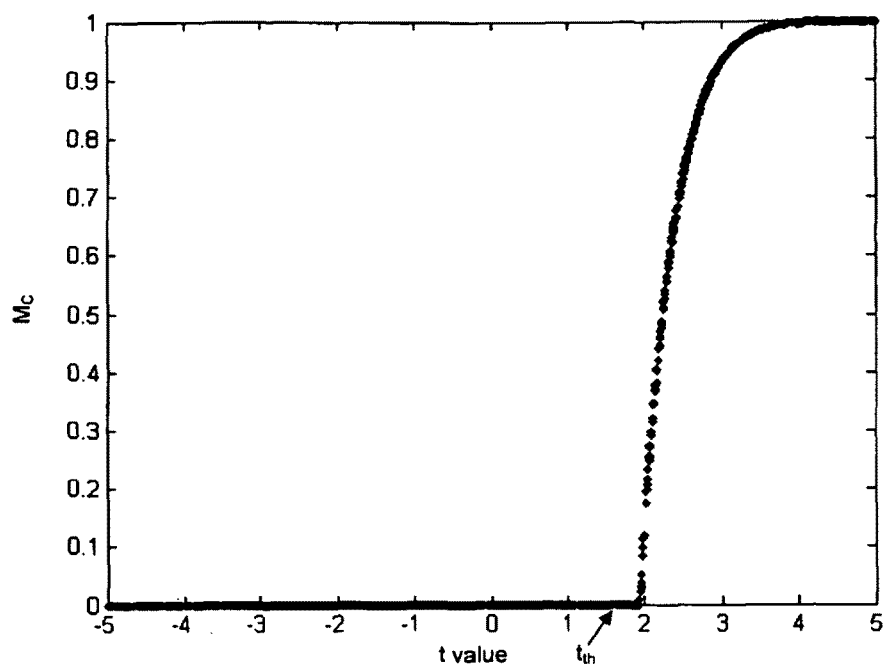
FIG. 10 shows contrast-test membership function.

Although conventional biomedical statistical analysis typically uses a P-value of 0.05 as a threshold for significance, a threshold value $P_{th}$ was chosen to optimize the segmentation performance, and $t_{th}$ is its corresponding t-value. Using $P_{th}$, a contrast membership function, $M_c$, was constructed as defined in equation (6), which assigns for each pixel being tested a probability of being on the prostate boundary based on its t-value. A plot of the contrast-test membership function $M_c$ is shown in FIG. 10.

$$M_c(\text{pixel}) = \begin{cases} \frac{(P_{th} - P_{pixel})}{P_{th}} & t_{pixel} > t_{th} \\ t \text{ value} & \\ 0 & \text{else} \end{cases} \quad (6)$$

Figure 12:
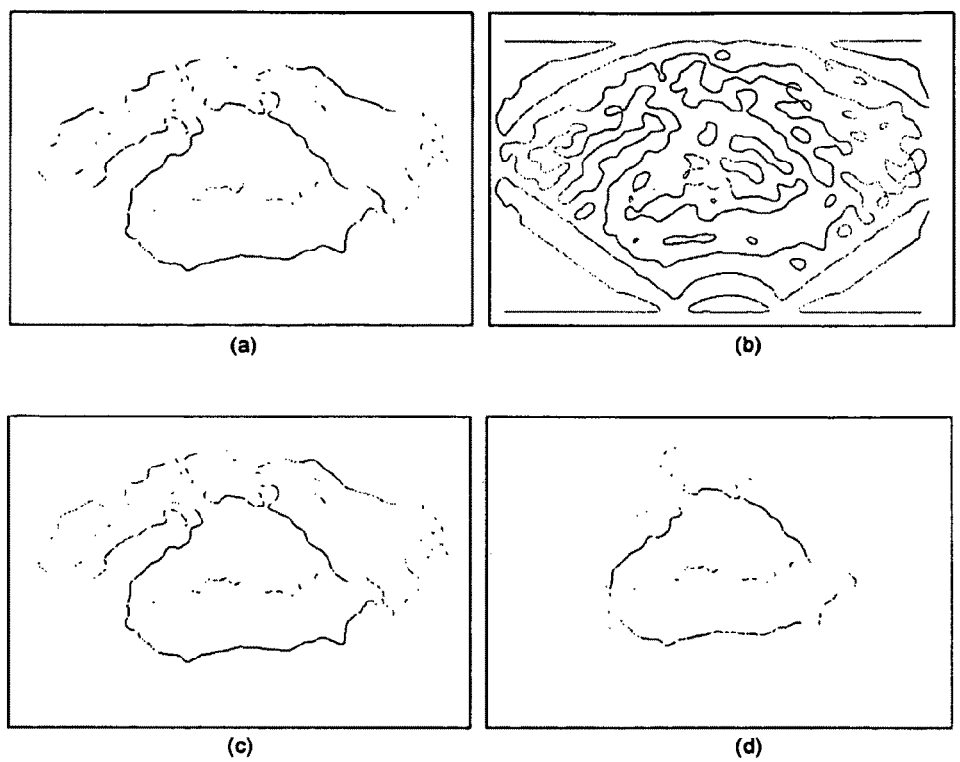
FIG. 12 shows pixels' membership values. (a) is an image showing the membership value at each pixel based on the contrast test, (b) is an image showing the membership value at each pixel based on the distance test, (c) is an image showing the membership value at each pixel based on the product of the contrast test and the distance test, and (d) is an image showing the pixels left after keeping the pixels detected first along radial lines and removing the ones detected later.

The image showing each pixel's probability measure is shown in FIG. 12a. The darker font represents pixels with a higher membership value, the lighter font represents pixels with a lower membership value, and the pixels with zero membership value are of course eliminated.

Figure 11:
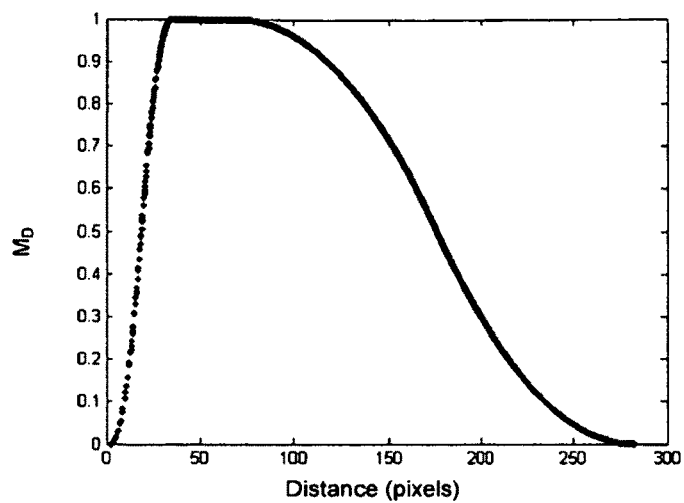
FIG. 11 shows distance test membership function.

In this test, the following fact is used: typical prostates in patients scheduled for brachytherapy are on average 3 cm in width and 2.8 cm in height. Therefore, assuming a circular shape of the prostate in the 2D ultrasound image, the boundary should be found between two distances, which encompass the mean size of the prostate. The following two distances were used from the centre, $d_1=7$ mm and $d_2=14$ mm, and constructed a membership function, $M_D$, as shown in FIG. 11, which assigns for each pixel being examined a probability value based on its distance from the prostate centre. This membership function is the built-in Matalb function pimf given by equation (7).

$$M_D(\text{pixel}, [a, b, c, d]) = pimf(\text{pixel}, [a, b, c, d]) \quad (7)$$
$$= smf(\text{pixel}, [a, b]) \times zmf(\text{pixel}, [c, d]);$$

where the parameters [a, b, c, d]=[minimum(dist), d1, d2, maximum(dist)]; dist is the vector of distance values from the edge pixels to the prostate centre; and the two functions smf and xmf are defined as shown in equations (8) and (10), respectively (MATLAB—The Language of Technical Computing).

$$smf(\text{pixel}, [a, b]) = \quad (8)$$
$$\begin{cases} 1 & \text{if } (a \geq b) \text{ and } \left(d_{pixel} \geq \frac{a+b}{2}\right) \\ 0 & \text{if } (a \geq b) \text{ and } \left(d_{pixel} < \frac{a+b}{2}\right) \\ 0 & \text{if } d_{pixel} \leq a \\ 2 \times \left[\left(\frac{d_{pixel} - a}{b - a}\right)^2\right] & \text{if } a < d_{pixel} \text{ and } \left(d_{pixel} \leq \frac{a+b}{2}\right) \\ 1 - 2 \times \left[\left(\frac{b - d_{pixel}}{b - a}\right)^2\right] & \text{if } \left(\frac{a+b}{2} < d_{pixel}\right) \text{ and } (d_{pixel} \leq b) \\ 1 & \text{if } b \leq d_{pixel} \end{cases}$$

$$zmf(\text{pixel}, [c, d]) = \quad (9)$$
$$\begin{cases} 1 & \text{if } (d \geq c) \text{ and } \left(d_{pixel} \leq \frac{c+d}{2}\right) \\ 0 & \text{if } (d \geq c) \text{ and } \left(d_{pixel} > \frac{c+d}{2}\right) \\ 1 & \text{if } d_{pixel} \leq d \\ 1 - 2 \times \left[\left(\frac{d_{pixel} - d}{d - c}\right)^2\right] & \text{if } d < d_{pixel} \text{ and } \left(d_{pixel} \leq \frac{d+c}{2}\right) \\ 2 \times \left[\left(\frac{c - d_{pixel}}{d - c}\right)^2\right] & \text{if } \left(\frac{d+c}{2} < d_{pixel}\right) \text{ and } (d_{pixel} \leq c) \\ 0 & \text{if } c \leq d_{pixel} \end{cases}$$

where $d_{pixel}$ is the distance from the pixel under consideration to the prostate centre.

The image showing each pixel's probability for being part of the prostate boundary based on the distance test is shown in FIG. 12(b). As with the contrast-test membership function, the darker font represents pixels with a higher membership value, the lighter font represents pixels with a lower membership value, and the pixels with zero membership value are of course eliminated.

Since a pixel on the prostate boundary has to satisfy both the contrast-test and the distance-test, we multiply the contrast-test membership function and the distance-test membership function to obtain $M_{CD}$ membership function as follows:

$$M_{CD}(\text{pixel}) = M_c(\text{pixel}) \times M_D(\text{pixel}) \quad (10)$$

The image showing each pixel's probability value based on $M_{CD}$ is shown in FIG. 12(c) using the same colour codes described previously. Although some of the false edge pixels are inside the gland, most of them are on the outside. Therefore, $M_{CD}$ was modified by removing more false edge pixels by assuming that true pixels are the first to be detected when scanning the image shown in FIG. 12(c) along radial lines from the centre. Therefore, a modified membership function $M'_{CD}$ was constructed as shown in equation 11 where the membership value of the first detected pixels along each radial line will be equal to $M_{CD}$, and those that lie along same radial lines but are further away from the centre will have a zero membership value. The image showing each pixel's probability value based on $M'_{CD}$ is shown in FIG. 12(d) using the same colour codes described previously. As shown in this figure, more false edges have been removed.

$$M_{CD}(\text{pixel}) = \begin{cases} M_{CD}(\text{pixel}) & \text{if pixel is first to be detected along a given radial line} \\ 0 & \text{else} \end{cases} \quad (11)$$

Since many false edge pixels still remain inside and outside the prostate gland, as shown in FIG. 12(d), the observation that the inside of the prostate is typically smoother than the outside was used to perform a texture test. If $\sigma_{out}^2$ and $\sigma_{in}^2$ are the intensity variances of the regions $I_{out}$ and $I_{in}$ respectively, then in order for an edge pixel to be on the prostate boundary, $I_{in}$ should be smoother than $I_{out}$, and as a result $\sigma_{out}^2 > \sigma_{in}^2$. Since estimates of $\sigma_{out}^2$ and $\sigma_{in}^2$ are subject to variation due to image noise, it was tested whether $\sigma_{out}^2$ is greater than $\sigma_{in}^2$, and assign a probability of boundary membership based on the F-test where F-statistic is defined as (Rosner 2000):

$$F_{th} \quad (12)$$

$$F = \frac{\sigma_{out}^2}{\sigma_{in}^2}$$

Figure 13:
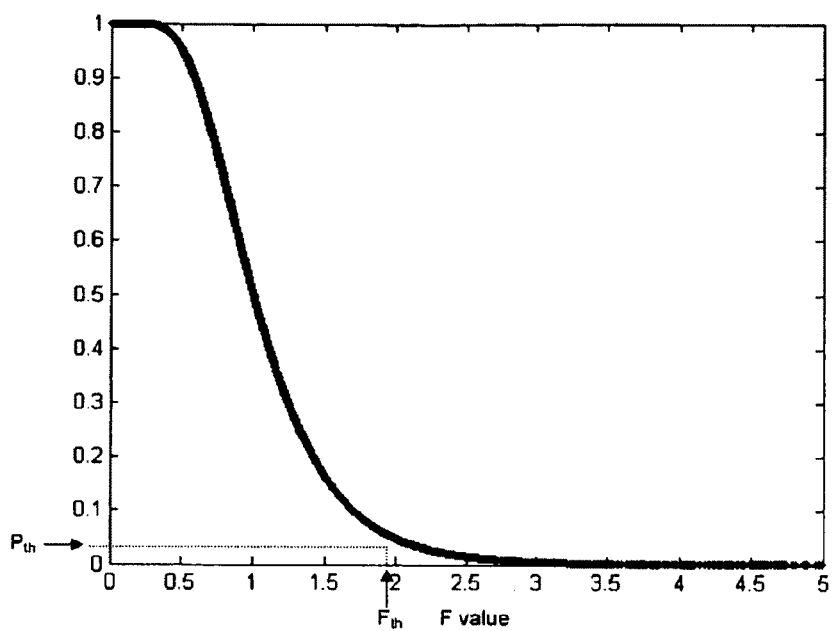
FIG. 13 shows different F-values with their corresponding P-values.

If a pixel is indeed on the prostate boundary, its F-value has to be significantly greater than 1. FIG. 13 shows the F-values of the image pixels with their corresponding P-values.

Figure 14:
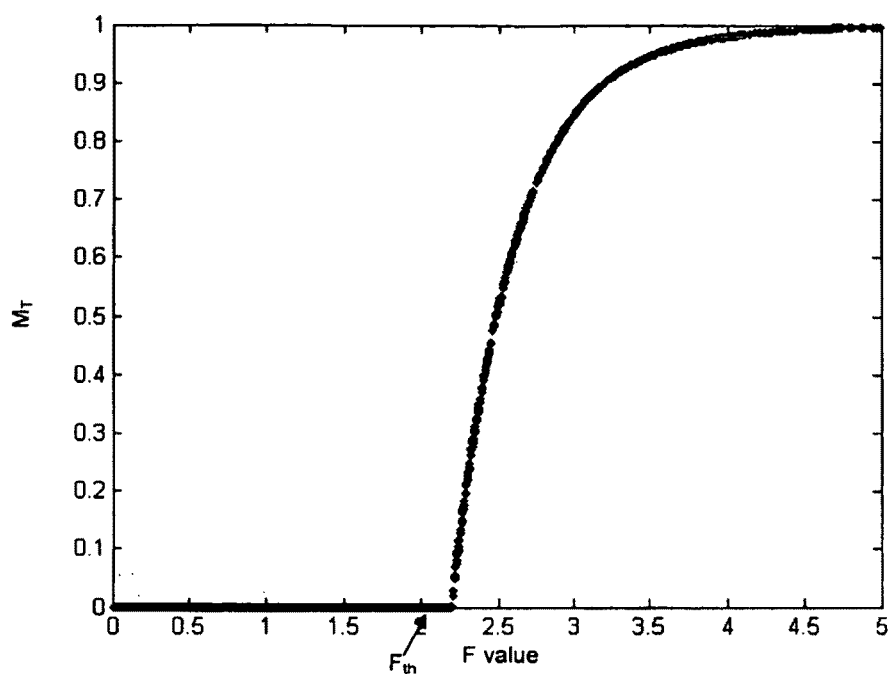
FIG. 14 shows F-test membership function.

Although conventional biomedical statistical analysis typically uses a P-value of 0.05 as a threshold for significance, a threshold value $P_{th}$ was chosen to optimize the segmentation performance, and $F_{th}$ is its corresponding F-value. Using $P_{th}$, we constructed a membership function, $M_T$, described in equation (13), which assigns for each pixel being tested a probability of being on the prostate boundary based on its F-value. A plot of the texture-test membership function $M_T$ is shown in FIG. 14.

$$M_T(\text{pixel}) = \begin{cases} \frac{(P_{threshold} - P_{pixel})}{P_{threshold}} & \text{if } F_{pixel} > F_{threshold} \\ 0 & \text{else} \end{cases} \quad (13)$$

Figure 15:
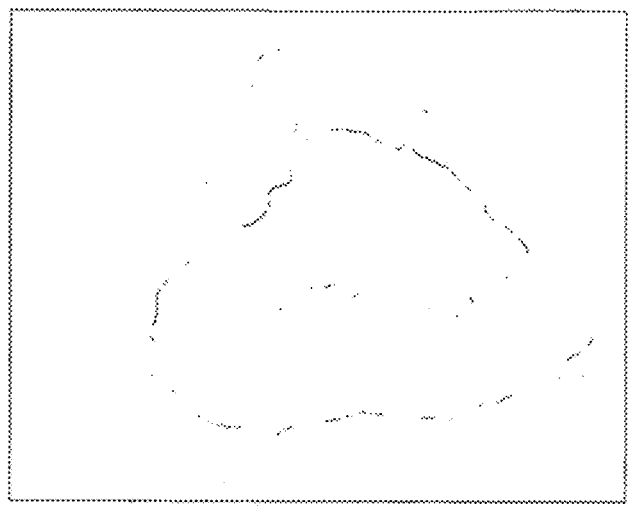
FIG. 15 shows remaining pixels based on the M membership function.
Figure 16:
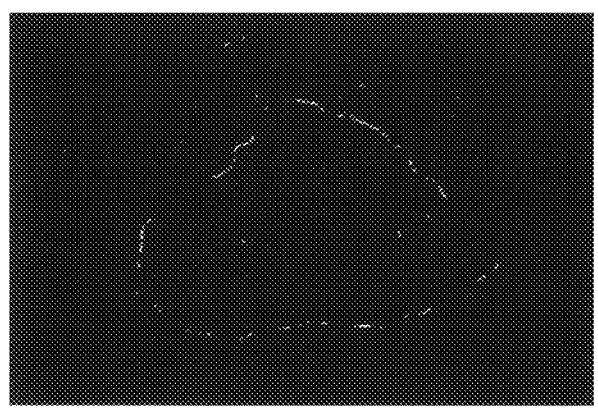
FIG. 16 shows remaining pixels based on the $M_{final}$ membership function.

A pixel on the prostate boundary has to satisfy all three tests; therefore, the final membership function M should be the product of $M_{CD}$ and $M_T$, as described in equation 14. The image showing each pixel's probability value based on the final membership function M using the colour codes as before is shown in FIG. 15. Most of the edge pixels with a probability greater than 0.7 are on the prostate boundary. Therefore, the final membership function, $M_{Final}$, was constructed as described in equation (15), which assigns a membership of zero to the pixels with probability less than 0.7. FIG. 16 shows all edge pixels remaining after removing those with a probability less than 0.7.

$$M(\text{pixel}) = M_{CD}(\text{pixel}) \times M_T(\text{pixel}) \quad (14)$$

$$M_{Final}(\text{pixel}) = \begin{cases} 1 & \text{if } M(\text{pixel}) \geq 0.7 \\ 0 & \text{else} \end{cases} \quad (15)$$

Figure 17:
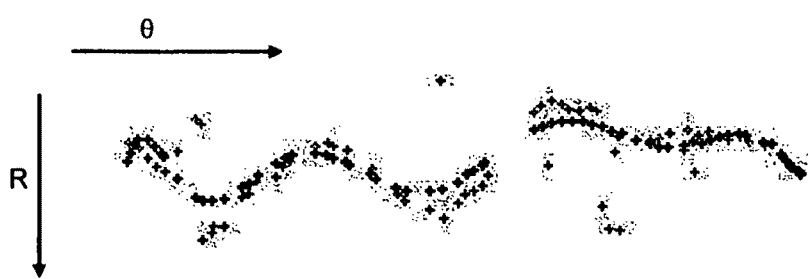
FIG. 17 shows polynomial fit. Gray: Candidate prostate boundary pixels; Black: fit.
Figure 18:
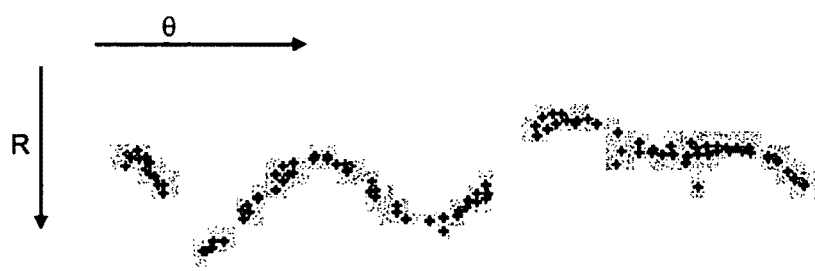
FIG. 18 shows final polynomial fit showing that the maximum distance from the fit is less than 4 mm. Gray: Candidate prostate boundary pixels; Black: fit
Figure 19:
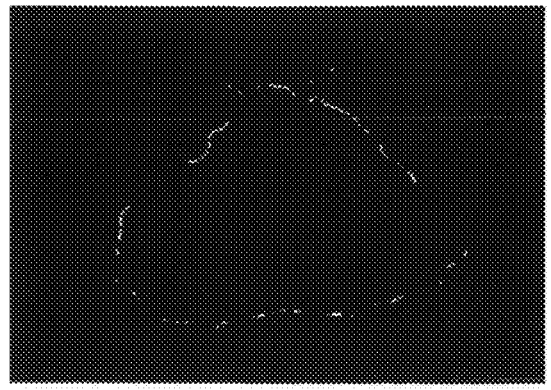
FIG. 19 shows the final pixels on the prostate boundary.

As shown in FIG. 16, some false edge pixels remain. If the prostate gland is perfectly circular, then mapping the image into $(R,\Theta)$ coordinates (where R is the distance from a pixel to the prostate centre and $\Theta$ is the clockwise angle that the pixel forms with the horizontal diameter) should result in the true edge pixels forming a straight line. However, if the prostate gland is elliptical, then this kind of mapping should result in the true edge pixels forming a curve that could be described by a $9^{th}$ order polynomial; false edge pixels would be far from the curve. Since a typical prostate gland in a transverse plane is elliptical, the removal of the false edge pixels remaining in the image shown in FIG. 16 can be carried out by mapping that image into $(R,\Theta)$ coordinates and fitting a polynomial to the pixels, as shown in FIG. 17. We then remove a candidate pixel with the maximum distance from the resulting fit and repeat the fit and the removal of the furthest pixel until the maximum distance of pixels away from the curve is less than 4 mm. The final polynomial fit is shown in FIG. 18, and the final image showing the remaining pixels on the prostate boundary is shown in FIG. 19.

Figure 20:
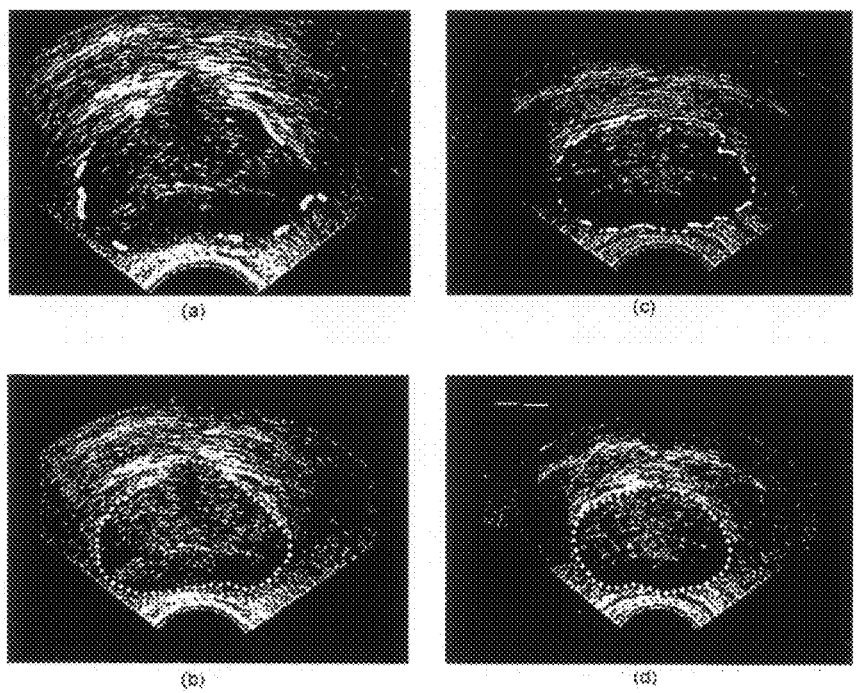
FIG. 20 shows the final results. (a) and (c) show the final pixels generated by our initialization algorithm before applying the DDC segmentation for two different prostate images, and (b) and (d) show the final result after deformation using DDC segmentation.

After the polynomial fitting, we are left with unconnected edge pixels that are highly probable to be on the prostate boundary. Some of these pixels might not be exactly on the boundary. To obtain a closed contour of the prostate boundary, we use these pixels as initial points to Ladak's et al. DDC model (Ladak et al. 2000), a polyline that deforms under the influence of internal and external forces to fit features in an image (Lobregt and Viergever 1995, Ladak et al. 2000). FIG. 20 shows two prostate images with their respective initialization points resulting from our algorithm, and final contours. FIG. 20 (*a*) shows a prostate image with the result from the initialization algorithm, and FIG. 20 (*b*) shows its closed contour after deformation with the DDC model. FIG. 20 (*c*) shows another prostate image with the result from our initialization algorithm, and FIG. 20 (*d*) shows its closed contour that results from the DDC segmentation.

To evaluate the algorithm in this present invention, we segmented 51 2D TRUS prostate images obtained from three different patients scheduled for brachytherapy using both versions of the algorithm: the semi-automatic version and the fully-automatic version. The 51 images were acquired using a transrectal ultrasound coupled to a 3D TRUS system developed in our lab (Tong et al. 1998). The images were 468×356 pixels each with pixel size approximately 0.2 mm×0.2 mm. The 'gold standard' in evaluating the proposed algorithm was manually outlined prostate boundaries of the same images performed by an expert radiologist.

Figure 21:
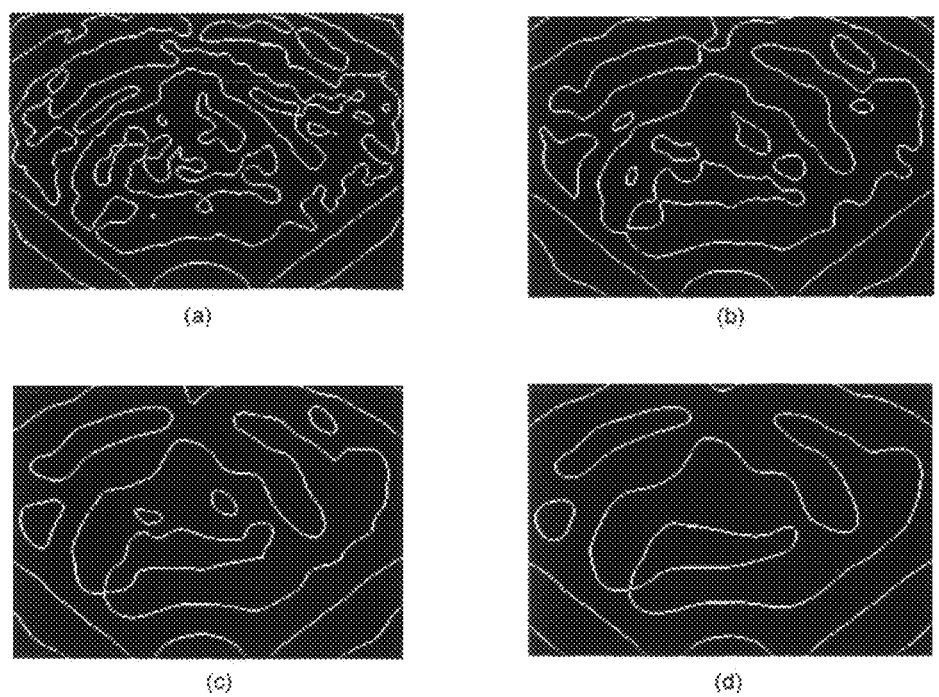
FIG. 21 shows the LoG filter output for one prostate image. (a) $\sigma=5$, (b) $\sigma=7$, (c) $\sigma=9$, and (d) $\sigma=11$.

Four different images were used to optimize the parameters employed in the algorithm. To optimize the standard deviation, $\sigma$, which determines the degree of smoothing of the LOG filter, we varied its value from $\sigma=1$ to $\sigma=11$ in increments of 2, and visually determined the value that resulted in more true edge pixels, less false edge pixels, and a contour that is closer to the prostate boundary for four different prostate images. FIG. 21 shows examples of the result of the LOG filter for one of the prostate images used with different values of $\sigma$. The optimum a value was found to be 7 (FIG. 21*b*).

The null hypothesis for the contrast-test was that the regions $I_{in}$ and $I_{out}$ on both sides of the boundary (see FIG. 8) have the same mean brightness level; in which case, it would be less probable that the pixel is a part of the prostate boundary. The alternative hypothesis was that these two regions have different mean brightness levels with the outside being brighter than the inside; in which case, it is more probable that the pixel is a part of the prostate boundary. For each pixel in question, we performed a T-test with a significance level $\alpha_T$, and obtained a p-value. If this p-value is less than $\alpha_T$, then we reject the null hypothesis and assume that the alternative hypothesis is true. The higher the value of $\alpha_T$, the more pixels we accept as being part of the prostate boundary. To determine the optimal significance level, we performed the T-test using 7 different values of $\alpha_T$ for each of the four images, from $\alpha_T=0.001$ to $\alpha_T=0.05$ and then computed the followings: the number of clusters on the prostate boundary, the gap between these clusters, and the number of clusters off the true prostate boundary. The objective was to find a combination that generated more clusters on the prostate boundary, smaller gaps between them, and fewer clusters off the prostate boundary. Table 1 shows for each $\alpha_T$ the mean of the values obtained for the four prostate images. $\alpha_T=0.03$ was found to be the optimum.

The F-test was used to compare the standard deviation on each side of a candidate boundary pixel. The null hypothesis was that the region inside, $R_{in}$, and the region outside, $R_{out}$, (see FIG. 8) have the same variance; in which case, it would be less probable that the pixel is a part of the prostate boundary. The alternative hypothesis was that these two regions have different variances; in which case, it is more probable that the pixel is a part of the prostate boundary. After multiplying the contrast-test membership function and the distance membership function using the optimum values for the parameters σ and $\alpha_T$, we performed an F-test with a significance level $\alpha_F$ for each pixel left in question, and obtained a p-value. Like the t-test, if this p-value is less than $\alpha_F$, then we reject the null hypothesis and assume that the alternative hypothesis is true. The higher the value of $\alpha_F$, the more pixels we accept as being a part of the prostate boundary. To determine the optimal $\alpha_F$ value, we performed the F-test using 7 different values for a for each of the four images, from $\alpha_F$=0.001 to $\alpha_F$=0.05 and then computed the followings: the number of clusters on the prostate boundary, the gap between these clusters, and the number of clusters off the prostate boundary. The objective was to find the value of $\alpha_F$, which generated more clusters on the prostate boundary, smaller gaps between them, and fewer clusters off the prostate boundary. Table 2 shows for each $\alpha_F$ the mean of the values obtained for the four prostate images. $\alpha_F$=0.03 was found to be the optimum for the F-test.

To test the overall performance of the algorithm, the following was determined: (1) the accuracy when the user inputs the prostate centre; (2) the sensitivity to the user input position and (3) the accuracy when the prostate centre is assumed to be the centre of the image and found automatically:

Automated initialization: Assuming that the prostate is centred at the centre of the image, and there is no need for the input of the user, the fully-automatic version of our proposed segmentation algorithm was used with the optimum parameter values found above to segment the prostate boundary using the set of 51 prostate images. The results of the fully-automatic version of the segmentation algorithm were compared with the manually segmented boundaries using the evaluation metrics described below.

Distance-based and area-based metrics were used to compare the boundaries outlined using either version of our algorithm (the semi-automatic version or the fully-automatic version) to the manually outlined boundaries (Nannayakkara et al. 2006, Chiu et al. 2004, Ladak et al. 2000).

Distance-based metrics were used to measure the distance between the contour generated using either version of our segmentation algorithm and the manually outlined contour. Let C={$c_i$, i=1, 2, ... K} be the set of vertices that define the algorithm-generated contour, and M={$m_j$=1:2, ... N} be the set of vertices that define the manually generated contour. To obtain a measure of the distance between both contours, these contours were linearly interpolated to have vertices 1 pixel apart, and then the distance between a vertex, $c_i$, from C and M, d($c_i$,M), was computed as shown in equation (16):

$$d(c_i, M) = \min_j \|c_i - m_j\|. \tag{16}$$

For each image, we computed the following three parameters:

1) MAD, the mean absolute distance that measures the mean error in the segmentation:

$$MAD = \frac{1}{k}\sum_{i=1}^{k} d(c_i, M). \tag{17}$$

2) MAXD, the maximum distance that measures the maximum error in segmentation:

$$MAXD = \max_{i \in [1,k]} \{d(c_i, M)\}. \tag{18}$$

3) PC, which is the percentage of vertices in C that have a distance to M less than 4 mm, evaluates the percentage of vertices in C considered to be very close to M. 4 mm, or 20 pixels, was used because previous studies showed that using an uncertainty of contouring less than 4 mm results in an impact on the dose that covers 90% of the target volume of less than 2%, and an impact on tumour control probability of less than 10%, which was not a significant impact on the implant dosimetry (Tong et al. 1998, Lindsay et al. 2003).

$$PC = \frac{\text{number of elements in } \{c_i \in C: d(c_i, M) \leq 20 \text{ pixels}\}}{k} \times 100\% \tag{19}$$

In order to evaluate the performance of the semi-automatic version and the fully-automatic version of the proposed algorithm on all images, the average of MID, MAXD, PC, was calculated along with their standard deviation for the complete set of 51 images. For each image; two area-based metrics were used to compare the area enclosed by the algorithm-generated contour and the area enclosed by the manually generated contour (Ladak et al. 2003, Chiu et al. 2004, Nanayakkara et al. 2006). Let $A_C$ and $A_M$ be the area enclosed by the algorithm-generated contour and the manually-generated contour respectively, then we define the following:

1) AO is the percent area overlap, which measures the proportional area correctly identified by the algorithm:

$$AO = \frac{A_C \cap A_M}{A_M} \times 100\% \tag{20}$$

2) AD is the area difference, which measures the proportional area falsely identified by the algorithm:

$$AD = \frac{|A_C - A_M|}{A_M} \times 100\% \tag{21}$$

In order to further evaluate the performance of the semi-automatic version and the fully-automatic version of the proposed algorithm on all images, the average of AO, AD was calculated along with their standard deviation for the complete set of 51 prostate images.

The initialization point for the same entire set of the 51 images analysed was fixed in table 3 to be the centre of the image. Table 4 shows the results of all the metrics described in section 3.3. The prostate images are tabulated in the same order as in table 3. Table 4 shows that the fully-automatic version of our proposed algorithm produced prostate boundaries with an average error of 0.82±0.4 mm, and an average maximum distance of 2.66±1.92 mm; over 99% of points within 4 mm from the manually generated contour. The resulting boundaries show an area overlap, AO, of 91.2% and an error, AD, of 7.09%.

The AO resulting from the semi-automatic version of our algorithm is 0.8% higher than AO produced by the fully-automatic version of our algorithm, and the AD resulting from the semi-automatic version of our algorithm is 1.4% higher than AD produced by the fully-automatic version of our algorithm. This demonstrates that the fully-automatic version of our proposed algorithm gave good results, very close to those obtained from the semi-automatic version.

The average run time for the present algorithm was approximately 10 seconds on a personal computer with a Pentium 4, 2.6 GHz, when implemented in Matlab. The time would be significantly reduced if the algorithm were implemented in C++.

The summary of the method described here is as follows:

A) A fully automated algorithm to select an object boundary.

B) A method for automatic object boundary segmentation using an image, comprising the steps of: acquiring a point at the approximate center in said image which is assumed to be the center of said object; filtering said image to identify said object edge candidates; length thresholding to remove false edges on said object boundary and keep as many true edges on said object boundary as possible; domain knowledge to remove any said object boundary candidates that are false edges and aid in identifying said object boundary; scanning of said image along radial lines keeping only first-detected said object boundary candidates; removal of remaining false edge pixels by fitting a polynomial to the said image points; generating an initial closed contour of said object's boundary using the Discrete Dynamic Contour (DDC) model.

C) The method of B), wherein said images are 2D TRUS, US, MRI and CT images of said object.

D) The method of B) and C), wherein no user selection of the said object center is needed since said object is typically centered at the approximate center of said ultrasound image.

E) The method of B) and C), wherein said filtering could be performed by and filtering system including but not limited to a Laplacian of Gaussian (LOG) filter and/or zero-crossing filtering.

F) The method of B) and C), wherein polynomial fitting removes the point with the maximum distance from the fit, and repeats the process until this maximum distance is less than 4 mm.

G) The method of A), wherein the use of pixels as initial points are used to generate an initial boundary which is deformed in a DDC model to obtain a closed contour of said object's boundary.

H) The method of A) and B), wherein said object is the prostate.

I) The method of H), wherein said domain knowledge includes; the inside of the prostate gland being typically darker than the outside, the inside of the prostate gland being typically smoother than the outside and an average prostate in patients undergoing a brachytherapy procedure being approximately 3 cm in width and 2.8 cm in height.

J) The method of claim H) and I), wherein since the average width and height of the prostate are known a circular or elliptical shape of the prostate in the 2D ultrasound image can be assumed, in which the boundary should be found between two distances that encompasses the mean size of the prostate.

K) A method for initializing a DDC model to obtain a closed contour of said object's boundary, comprising the steps of: acquiring a point at the center in said image which is assumed to be the approximate center of said object; filtering said image to identify said object edge candidates; length thresholding to remove false edges on said object boundary and keep as many true edges on said object boundary as possible; domain knowledge to remove any said object boundary candidates that are false edges and aid in identifying said object boundary; scanning of said image along radial lines keeping only first-detected said object boundary candidates; removal of remaining false edge pixels by fitting a polynomial to the said image points; generating an initial closed contour of said object's boundary using the Discrete Dynamic Contour (DDC) model.

TABLE 1

| $\alpha_T$ value | Mean # of clusters on prostate boundary | Mean maximum gap between clusters on boundary (degrees) | Mean # of clusters off boundary |
|---|---|---|---|
| 0.001 | 8 | 15.3 | 19 |
| 0.003 | 9 | 14.7 | 18 |
| 0.005 | 8 | 14.0 | 18 |
| 0.008 | 8 | 13.7 | 21 |
| 0.01 | 8 | 13.7 | 20 |
| 0.03 | 6 large clusters | 13.5 | 21 |
| 0.05 | 5 large clusters | 13.5 | 24 |

TABLE 2

| $\alpha_F$ value | Mean # of clusters on prostate boundary | Mean maximum gap between clusters (degrees) | Mean # of clusters off boundary |
|---|---|---|---|
| 0.001 | 13 | 60.3 | 7 |
| 0.003 | 18 | 59.4 | 8 |
| 0.005 | 17 | 59.2 | 10 |
| 0.008 | 17 | 58.8 | 11 |
| 0.01 | 16 | 58.6 | 12 |
| 0.03 | 23 | 53.9 | 20 |
| 0.05 | 21 | 51.9 | 26 |

TABLE 3

| Prostate Image number | MAD (pixels) | MAD (mm) | MAXD (pixels) | MAXD (mm) | PC (%) | AD (%) | AO (%) |
|---|---|---|---|---|---|---|---|
| 1 | 3.2 | 0.6 | 9.5 | 1.9 | 100 | 7.0 | 91.7 |
| 2 | 2.9 | 0.6 | 9.0 | 1.8 | 100 | 4.2 | 93.5 |
| 3 | 2.2 | 0.5 | 6.9 | 1.4 | 100 | 2.9 | 95.4 |
| 4 | 2.1 | 0.4 | 9.0 | 1.8 | 100 | 2.4 | 95.0 |
| 5 | 2.4 | 0.5 | 5.4 | 1.1 | 100 | 3.3 | 94.7 |
| 6 | 2.5 | 0.5 | 7.8 | 1.6 | 100 | 0.1 | 95.9 |
| 7 | 1.6 | 0.3 | 5.0 | 1.0 | 100 | 1.7 | 96.0 |
| 8 | 4.3 | 0.9 | 15.3 | 3.1 | 100 | 9.2 | 88.1 |
| 9 | 7.7 | 1.5 | 26.3 | 5.3 | 94 | 6.0 | 85.1 |
| 10 | 2.8 | 0.6 | 9.7 | 1.9 | 100 | 5.3 | 92.8 |
| 11 | 6.6 | 1.3 | 18.3 | 3.7 | 100 | 13.8 | 83.6 |
| 12 | 4.7 | 1.0 | 16.0 | 3.2 | 100 | 5.0 | 92.0 |
| 13 | 3.6 | 0.7 | 15.6 | 3.1 | 100 | 6.1 | 91.4 |
| 14 | 2.5 | 0.5 | 6.7 | 1.3 | 100 | 4.3 | 94.0 |
| 15 | 2.7 | 0.6 | 8.5 | 1.7 | 100 | 1.2 | 96.3 |
| 16 | 3.1 | 0.6 | 10.3 | 2.1 | 100 | 4.5 | 93.1 |
| 17 | 2.9 | 0.6 | 7.5 | 1.5 | 100 | 6.0 | 93.2 |
| 18 | 2.5 | 0.5 | 7.8 | 1.6 | 100 | 3.4 | 94.6 |
| 19 | 1.9 | 0.4 | 8.0 | 1.6 | 100 | 1.5 | 96.9 |
| 20 | 3.2 | 0.6 | 11.7 | 2.3 | 100 | 0.4 | 95.4 |
| 21 | 3.7 | 0.8 | 11.9 | 2.4 | 100 | 2.4 | 92.8 |
| 22 | 4.2 | 0.8 | 14.4 | 2.9 | 100 | 2.0 | 93.7 |
| 23 | 2.8 | 0.6 | 6.8 | 1.4 | 100 | 6.9 | 92.4 |
| 24 | 2.7 | 0.5 | 7.5 | 1.5 | 100 | 2.7 | 94.7 |
| 25 | 4.9 | 1.0 | 11.9 | 2.4 | 100 | 9.0 | 88.3 |
| 26 | 3.4 | 0.7 | 11.1 | 2.2 | 100 | 5.4 | 92.3 |
| 27 | 4.4 | 0.9 | 10.8 | 2.2 | 100 | 11.1 | 88.8 |
| 28 | 2.0 | 0.4 | 6.4 | 1.3 | 100 | 3.0 | 95.5 |
| 29 | 4.0 | 0.8 | 16.4 | 3.3 | 100 | 6.7 | 90.9 |
| 30 | 3.1 | 0.6 | 15.8 | 3.2 | 100 | 5.8 | 92.7 |
| 31 | 3.0 | 0.6 | 11.3 | 2.3 | 100 | 0.3 | 96.0 |
| 32 | 2.2 | 0.4 | 7.0 | 1.4 | 100 | 0.7 | 96.5 |
| 33 | 2.2 | 0.4 | 6.4 | 1.3 | 100 | 1.5 | 96.3 |
| 34 | 3.5 | 0.7 | 21.0 | 4.2 | 99.1 | 2.7 | 94.3 |
| 35 | 3.1 | 0.6 | 15.0 | 3.0 | 100 | 1.6 | 94.7 |
| 36 | 3.7 | 0.7 | 13.1 | 2.6 | 100 | 5.6 | 93.3 |
| 37 | 3.9 | 0.8 | 10.4 | 2.1 | 100 | 3.8 | 92.2 |
| 38 | 3.5 | 0.7 | 12.4 | 2.5 | 100 | 10.1 | 89.6 |
| 39 | 7.8 | 1.6 | 35.4 | 7.1 | 86.9 | 15.6 | 82.5 |

TABLE 3-continued

| Prostate Image number | MAD (pixels) | MAD (mm) | MAXD (pixels) | MAXD (mm) | PC (%) | AD (%) | AO (%) |
|---|---|---|---|---|---|---|---|
| 40 | 4.7 | 0.9 | 9.7 | 1.9 | 100 | 13.4 | 86.5 |
| 41 | 5.7 | 1.1 | 15.9 | 3.2 | 100 | 12.6 | 87.2 |
| 42 | 3.8 | 0.8 | 14.1 | 2.8 | 100 | 10.4 | 89.3 |
| 43 | 4.3 | 0.9 | 18.3 | 3.7 | 100 | 11.6 | 87.5 |
| 44 | 1.6 | 0.3 | 4.8 | 1.0 | 100 | 2.9 | 96.1 |
| 45 | 4.2 | 0.9 | 13.7 | 2.7 | 100 | 11.9 | 87.3 |
| 46 | 3.4 | 0.7 | 12.8 | 2.6 | 100 | 8.8 | 89.4 |
| 47 | 3.7 | 0.7 | 10.6 | 2.1 | 100 | 8.6 | 89.8 |
| 48 | 1.9 | 0.4 | 8.4 | 1.7 | 100 | 2.1 | 95.3 |
| 49 | 4.5 | 0.9 | 14.6 | 2.9 | 100 | 12.9 | 86.5 |
| 50 | 3.3 | 0.7 | 11.7 | 2.3 | 100 | 9.7 | 90.0 |
| 51 | 2.4 | 0.5 | 8.1 | 1.6 | 100 | 0.8 | 94.4 |
| Mean | 3.5 | 0.7 | 11.8 | 2.4 | 99.6 | 5.7 | 92.1 |
| Standard Deviation | 1.4 | 0.3 | 5.5 | 1.1 | 2 | 4.2 | 3.6 |

TABLE 4

| Prostate Image (number) | MAD (pixels) | MAD (mm) | MAXD (pixels) | MAXD (mm) | PC (%) | AD (%) | AO (%) |
|---|---|---|---|---|---|---|---|
| 1 | 3.1 | 0.6 | 8.0 | 1.6 | 100 | 8.2 | 91.5 |
| 2 | 3.6 | 0.7 | 9.0 | 1.8 | 100 | 3.7 | 92.6 |
| 3 | 2.1 | 0.4 | 6.8 | 1.4 | 100 | 2.8 | 95.3 |
| 4 | 2.4 | 0.5 | 9.9 | 2.0 | 100 | 0.1 | 96.2 |
| 5 | 2.2 | 0.4 | 4.7 | 0.9 | 100 | 3.0 | 95.0 |
| 6 | 2.0 | 0.4 | 6.5 | 1.3 | 100 | 0.9 | 96.4 |
| 7 | 1.9 | 0.4 | 5.5 | 1.1 | 100 | 0.5 | 96.3 |
| 8 | 4.0 | 0.8 | 13.7 | 2.7 | 100 | 9.2 | 88.9 |
| 9 | 5.8 | 1.2 | 15.5 | 3.1 | 100 | 7.3 | 85.9 |
| 10 | 3.7 | 0.7 | 9.6 | 1.9 | 100 | 8.9 | 89.6 |
| 11 | 7.0 | 1.4 | 23.3 | 4.7 | 98.5 | 5.6 | 85.8 |
| 12 | 4.7 | 0.9 | 13.0 | 2.6 | 100 | 3.3 | 90.6 |
| 13 | 4.5 | 0.9 | 16.0 | 3.2 | 100 | 8.3 | 89.4 |
| 14 | 3.8 | 0.8 | 8.9 | 1.8 | 100 | 6.6 | 91.3 |
| 15 | 3.8 | 0.8 | 9.5 | 1.9 | 100 | 2.3 | 93.8 |
| 16 | 2.3 | 0.5 | 9.0 | 1.8 | 100 | 4.7 | 94.8 |
| 17 | 10.5 | 2.1 | 47.8 | 9.6 | 77.9 | 19.8 | 78.7 |
| 18 | 7.3 | 1.5 | 30.0 | 6.0 | 84 | 15.6 | 83.5 |
| 19 | 2.8 | 0.6 | 8.2 | 1.6 | 100 | 4.9 | 94.3 |
| 20 | 3.9 | 0.8 | 15.6 | 3.1 | 100 | 0.1 | 93.9 |
| 21 | 2.8 | 0.6 | 7.9 | 1.6 | 100 | 2.0 | 94.3 |
| 22 | 4.7 | 0.9 | 14.2 | 2.8 | 100 | 3.5 | 92.4 |
| 23 | 4.4 | 0.9 | 10.9 | 2.2 | 100 | 4.3 | 95.8 |
| 24 | 3.1 | 0.6 | 8.2 | 1.6 | 100 | 0.1 | 95.2 |
| 25 | 6.0 | 1.2 | 13.4 | 2.7 | 100 | 10.8 | 86.1 |
| 26 | 3.9 | 0.8 | 11.0 | 2.2 | 100 | 4.4 | 92.1 |
| 27 | 4.3 | 0.9 | 10.6 | 2.1 | 100 | 10.9 | 89.0 |
| 28 | 1.8 | 0.4 | 4.4 | 0.9 | 100 | 0.6 | 96.7 |
| 29 | 5.0 | 1.0 | 17.6 | 3.5 | 100 | 5.9 | 89.7 |
| 30 | 4.1 | 0.8 | 17.8 | 3.6 | 100 | 9.9 | 89.6 |
| 31 | 2.6 | 0.5 | 10.8 | 2.2 | 100 | 0.8 | 97.3 |
| 32 | 2.4 | 0.5 | 6.6 | 1.3 | 100 | 0.3 | 96.6 |
| 33 | 2.5 | 0.5 | 8.2 | 1.6 | 100 | 0.9 | 96.5 |
| 34 | 1.9 | 0.4 | 5.6 | 1.1 | 100 | 0.4 | 97.7 |
| 35 | 2.0 | 0.4 | 7.0 | 1.4 | 100 | 2.5 | 98.3 |
| 36 | 3.1 | 0.6 | 8.6 | 1.7 | 100 | 2.2 | 95.8 |
| 37 | 2.9 | 0.6 | 7.7 | 1.5 | 100 | 4.9 | 93.3 |
| 38 | 9.3 | 1.9 | 46.2 | 9.2 | 84.8 | 22.4 | 77.5 |
| 39 | 5.5 | 1.1 | 10.8 | 2.2 | 100 | 16.0 | 84.0 |
| 40 | 4.3 | 0.9 | 14.0 | 2.8 | 100 | 8.7 | 89.6 |
| 41 | 3.2 | 0.6 | 11.3 | 2.3 | 100 | 8.0 | 91.7 |
| 42 | 6.0 | 1.2 | 13.2 | 2.6 | 100 | 3.8 | 91.2 |
| 43 | 5.1 | 1.0 | 16.0 | 3.2 | 100 | 14.5 | 85.1 |
| 44 | 9.7 | 1.9 | 18.1 | 3.6 | 100 | 0.6 | 80.1 |
| 45 | 5.7 | 1.1 | 17.7 | 3.5 | 100 | 15.8 | 83.2 |
| 46 | 3.0 | 0.6 | 8.6 | 1.7 | 100 | 27.3 | 90.7 |
| 47 | 5.1 | 1.0 | 13.5 | 2.7 | 100 | 12.8 | 85.8 |
| 48 | 7.0 | 1.4 | 44.3 | 8.9 | 87.6 | 29.1 | 97.1 |
| 49 | 2.8 | 0.6 | 7.1 | 1.4 | 100 | 8.5 | 91.5 |
| 50 | 3.0 | 0.6 | 12.3 | 2.5 | 100 | 8.0 | 91.0 |
| 51 | 2.2 | 0.4 | 6.2 | 1.2 | 100 | 1.9 | 94.5 |
| Mean | 4.1 | 0.8 | 13.3 | 2.7 | 98.7 | 7.1 | 91.2 |
| standard deviation | 2.0 | 0.4 | 9.6 | 1.9 | 4.57 | 6.9 | 5.1 |

What is claimed is:

1. A method for automatic boundary segmentation of an object in a medical image, comprising the steps of:
   determining a point indicating a center or an approximate center of an object in a medical image displayed on a display;
   applying a filter to the medical image so as to determine candidate pixels as edge pixels indicating a boundary of the object;
   removing linked candidate pixels, a length of the linked candidate pixels being shorter than a predetermined threshold;
   determining a pixel among the candidate pixels as a false edge of the boundary of the object by using domain knowledge and removing the candidate pixel determined as the false edge, wherein the determining is based on a probability that the candidate pixel indicates part of the boundary of the object, wherein the probability is determined based on a combination of the following:
   a contrast membership function;
   a domain membership function; and
   a texture membership function;
   identifying candidate pixels which are first detected when the medical image is scanned along each radial direction from the center as the remaining candidate pixels;
   removing a candidate pixel from the remaining candidate pixels by fitting a polynomial to the remaining candidate pixels;
   generating a closed contour as the boundary of the object by applying a Discrete Dynamic Contour (DDC) model to the remaining candidate pixels other than the candidate pixels removed by fitting a polynomial to the remaining candidate pixels; and
   displaying the closed contour on the display.

2. The method according to claim 1, wherein the medical image is one of a two dimensional TRUS image, a two dimensional ultrasound image, a two dimensional MR image and a two dimensional X-ray CT image of the object.

3. The method according to claim 1, wherein the medical image is filtered by convolving the medical image with a Gaussian filter or a zero-crossing filter.

4. The method according to claim 3, wherein the medical image filtered with the Gaussian filter is filtered by convolving the medical image filtered with the Gaussian filter with a Laplacian filter.

5. The method according to claim 1, wherein the medical image is filtered by convolving the medical image with a convolution of a Gaussian filter or a zero-crossing filter and a Laplacian filter.

6. The method according to claim 1, wherein the step of removing a candidate pixel from the remaining candidate pixels by fitting a polynomial to the remaining candidate pixels comprises the steps of:
   (a) determining an order of a polynomial;
   (b) fitting the polynomial to the remaining candidate pixels and removing a candidate pixel at a point having a maximum distance from a fit between the polynomial having the order determined in the step (a) and the remaining candidate pixels; and (c) if the maximum distance is equal or more than a predetermined value, changing an order of a polynomial to be fitted to the remaining candidate pixels;

(d) fitting the polynomial having the order changed in the step (c) to the remaining candidate pixels and removing a candidate pixel at a point having a maximum distance from a fit between the polynomial having the order changed in the step (c) and the remaining candidate pixels; and (e) repeating the steps (c) and (d) until the maximum distance is less than the predetermined value.

7. The method according to claim 1, wherein the remaining candidate pixels other than the candidate pixels removed by fitting a polynomial to the remaining candidate pixels are used as initial points to generate an initial boundary which is deformed in a DDC model to obtain a closed contour of said object's boundary.

8. The method according to claim 1, wherein the object is a prostate.

9. The method according to claim 8, wherein the domain knowledge includes at least one of
an inside of a prostate gland being darker than an outside of the prostate gland, the inside of the prostate gland being smoother than the outside of the prostate gland, and
a size of the prostate being approximately 3 cm in width and 2.8 cm in height if a subject of the medical image is in a therapeutic procedure.

10. The method according to claim 8, wherein the domain knowledge includes at least one of
an inside of a prostate gland being darker than an outside of the prostate gland, the inside of the prostate gland being smoother than the outside of the prostate gland, and
a size of the prostate being approximately 3 cm in width and 2.8 cm in height if a subject of the medical image is in a diagnostic procedure.

11. The method according to claim 8, wherein the domain knowledge includes the boundary of the prostate being within a substantially circular or substantially elliptical shape, the prostrate having a width equal or less than 3 cm and a height equal or less than 2.8 cm.

12. A non-transitory machine-readable medium storing a computer program for automatic boundary segmentation of an object in a medical image, the computer program comprising the steps of:
determining a point indicating a center or an approximate center of an object in a medical image displayed on a display;
applying a filter to the medical image so as to determine candidate pixels as edge pixels indicating a boundary of the object;
removing linked candidate pixels, a length of the linked candidate pixels being shorter than a predetermined threshold;
determining a pixel among the candidate pixels as a false edge of the boundary of the object by using domain knowledge and removing the candidate pixel determined as the false edge, wherein the determining is based on a probability that the candidate pixel indicates part of the boundary of the object, wherein the probability is determined based on a combination of the following:
a contrast membership function;
a domain membership function; and
a texture membership function;
identifying candidate pixels which are first detected when the medical image is scanned along each radial direction from the center as the remaining candidate pixels;
removing a candidate pixel from the remaining candidate pixels by fitting a polynomial to the remaining candidate pixels;
generating a closed contour as the boundary of the object by applying a Discrete Dynamic Contour (DDC) model to the remaining candidate pixels other than the candidate pixels removed by fitting a polynomial to the remaining candidate pixels; and
displaying the closed contour on the display.

13. The machine-readable medium according to claim 12, wherein the medical image is one of a two dimensional TRUS image, a two dimensional ultrasound image, a two dimensional MR image and a two dimensional X-ray CT image of the object.

14. The machine-readable medium according to claim 12, wherein the medical image is filtered by convolving the medical image with a Gaussian filter or a zero-crossing filter.

15. The machine-readable medium according to claim 14, wherein the medical image filtered with the Gaussian filter is filtered by convolving the medical image filtered with the Gaussian filter with a Laplacian filter.

16. The machine-readable medium according to claim 12, wherein the medical image is filtered by convolving the medical image with a convolution of a Gaussian filter or a zero-crossing filter and a Laplacian filter.

17. The machine-readable medium according to claim 12, wherein the step of removing a candidate pixel from the remaining candidate pixels by fitting a polynomial to the remaining candidate pixels comprises the steps of:
(a) determining an order of a polynomial;
(b) fitting the polynomial to the remaining candidate pixels and removing a candidate pixel at a point having a maximum distance from a fit between the polynomial having the order determined in the step (a) and the remaining candidate pixels; and
(c) if the maximum distance is equal or more than a predetermined value, changing an order of a polynomial to be fitted to the remaining candidate pixels;
(d) fitting the polynomial having the order changed in the step (c) to the remaining candidate pixels and removing a candidate pixel at a point having a maximum distance from a fit between the polynomial having the order changed in the step (c) and the remaining candidate pixels; and
(e) repeating the steps (c) and (d) until the maximum distance is less than the predetermined value.

18. The machine-readable medium according to claim 12, wherein the remaining candidate pixels other than the candidate pixels removed by fitting a polynomial to the remaining candidate pixels are used as initial points to generate an initial boundary which is deformed in a DDC model to obtain a closed contour of said object's boundary.

19. The machine-readable medium according to claim 12, wherein the object is a prostate.

20. The machine-readable medium according to claim 19, wherein the domain knowledge includes at least one of
an inside of a prostate gland being darker than an outside of the prostate gland, the inside of the prostate gland being smoother than the outside of the prostate gland, and
a size of the prostate being approximately 3 cm in width and 2.8 cm in height if a subject of the medical image is in a therapeutic procedure.

21. The machine-readable medium according to claim 19, wherein the domain knowledge includes at least one of
- an inside of a prostate gland being darker than an outside of the prostate gland, the inside of the prostate gland being smoother than the outside of the prostate gland, and
- a size of the prostate being approximately 3 cm in width and 2.8 cm in height if a subject of the medical image is in a diagnostic procedure.

22. The machine-readable medium according to claim 19, wherein the domain knowledge includes the boundary of the prostate being within a substantially circular or substantially elliptical shape, the prostrate having a width equal or less than 3 cm and a height equal or less than 2.8 cm.

23. A method for automatic boundary segmentation of an object in a medical image, the method comprising:
- applying a Gaussian filter and a Laplacian filter to the medical image to identify a first set of pixels in the medical image, wherein each of the identified first set of pixels indicates a potential boundary of the object;
- removing a first one of the first set of identified pixels to derive a second set of identified pixels if the first one of the first set of identified pixels is part of a group of linked pixels which includes less than a predetermined number of pixels;
- utilizing domain knowledge to determine a probability that a first one of the second set of identified pixels indicates part of the boundary of the object, wherein the probability is determined based on a combination of the following:
  - a contrast membership function;
  - a domain membership function; and
  - a texture membership function;
- removing the first one of the second set of identified pixels to derive a third set of identified pixels if the determined probability for the first one of the second set of identified pixels is below a predetermined threshold;
- removing a first one of the third set of identified pixels to derive a fourth set of identified pixels if the first one of the third set of identified pixels is more than a predetermined distance from a curve described by a polynomial, wherein the curve indicates the potential boundary of the object; and
- applying a discrete dynamic contour model to the fourth set of identified pixels.

* * * * *